(12) United States Patent
Raichle et al.

(10) Patent No.: US 9,487,093 B2
(45) Date of Patent: Nov. 8, 2016

(54) CONTROL DEVICE FOR A DC-TO-DC CONVERTER OF AN ELECTRICAL DRIVE SYSTEM, AND A METHOD FOR OPERATING A DC-TO-DC CONVERTER

(75) Inventors: Daniel Raichle, Vaihingen (DE); Thomas Knorpp, Freiberg A. N. (DE); Michael Ruffer, Ludwigsburg (DE); Markus Michels, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 437 days.

(21) Appl. No.: 14/345,768

(22) PCT Filed: Aug. 2, 2012

(86) PCT No.: PCT/EP2012/065129
§ 371 (c)(1),
(2), (4) Date: Mar. 19, 2014

(87) PCT Pub. No.: WO2013/041280
PCT Pub. Date: Mar. 28, 2013

(65) Prior Publication Data
US 2014/0217817 A1    Aug. 7, 2014

(30) Foreign Application Priority Data

Sep. 20, 2011 (DE) .......................... 10 2011 083010

(51) Int. Cl.
*B60L 1/00* (2006.01)
*B60L 11/02* (2006.01)
(Continued)

(52) U.S. Cl.
CPC ............... *B60L 11/02* (2013.01); *B60L 1/003* (2013.01); *B60L 1/006* (2013.01); *B60L 1/08* (2013.01);
(Continued)

(58) Field of Classification Search
CPC ...................................... B60L 11/02
USPC ......................................... 307/10.1
See application file for complete search history.

(56) References Cited

U.S. PATENT DOCUMENTS

| 5,848,659 A * | 12/1998 | Karg ....................... B60L 11/02 180/65.245 |
| 6,486,568 B1 * | 11/2002 | King ....................... B60L 11/02 307/66 |

(Continued)

FOREIGN PATENT DOCUMENTS

| DE | 10313215 | 10/2004 |
| EP | 1306262 | 5/2003 |

(Continued)

OTHER PUBLICATIONS

International Search Report for Application No. PCT/EP2012/065129 dated Nov. 12, 2012 (English Translation, 3 pages).

*Primary Examiner* — Stephen W Jackson
(74) *Attorney, Agent, or Firm* — Michael Best & Friedrich LLP

(57) ABSTRACT

The invention relates to an electrical drive system of a hybrid vehicle, comprising: a traction battery (1), a high-voltage intermediate circuit (2), a pulse-controlled inverter (3) which is coupled to the high voltage intermediate circuit (2), an electrical machine (5) which is coupled to the pulse-controlled inverter (3); a DC-to-DC converter (6) which is coupled to the pulse-controlled inverter (3) and the high-voltage intermediate circuit (2) and is designed to convert a high voltage (UE) from the high-voltage intermediate circuit (2) into a low voltage (UA) for a vehicle electrical system; a low-voltage battery (8) which is coupled to the DC-to-DC converter (6); a plurality of selectively-connectable electrical consumers (9a, 9b) of the vehicle electrical system, which are coupled to the low-voltage battery (8) and the DC-to-DC converter (6); and a control device (7) which, in the event of a traction battery failure, is designed to operate the DC-to-DC converter (6) in a current-controlled manner using the electrical machine so as to supply said vehicle electrical system consumers (9a, 9b).

9 Claims, 3 Drawing Sheets

(51) Int. Cl.
*B60L 3/00* (2006.01)
*B60L 11/18* (2006.01)
*B60L 1/08* (2006.01)
*B60L 11/14* (2006.01)

(52) U.S. Cl.
CPC .............. *B60L 3/0046* (2013.01); *B60L 11/14* (2013.01); *B60L 11/1868* (2013.01); *B60L 2210/10* (2013.01); *B60L 2210/12* (2013.01); *B60L 2210/40* (2013.01); *B60L 2240/529* (2013.01); *B60L 2240/547* (2013.01); *B60L 2240/549* (2013.01); *B60L 2260/42* (2013.01); *Y02T 10/70* (2013.01); *Y02T 10/7005* (2013.01); *Y02T 10/7066* (2013.01); *Y02T 10/7077* (2013.01); *Y02T 10/7216* (2013.01); *Y02T 10/7233* (2013.01); *Y02T 10/7241* (2013.01)

(56) References Cited

U.S. PATENT DOCUMENTS

| | | | |
|---|---|---|---|
| 8,036,000 B2* | 10/2011 | Ying | H02M 3/3376 |
| | | | 363/132 |
| 8,598,861 B2* | 12/2013 | Teh | G05F 1/56 |
| | | | 323/313 |
| 9,124,179 B2* | 9/2015 | Knorpp | H02M 3/22 |
| 9,287,704 B2* | 3/2016 | Pushkolli | H02J 1/08 |
| 2010/0145561 A1 | 6/2010 | Song | |

FOREIGN PATENT DOCUMENTS

| | | |
|---|---|---|
| EP | 1603224 | 12/2005 |
| JP | 2010130877 | 6/2010 |

* cited by examiner

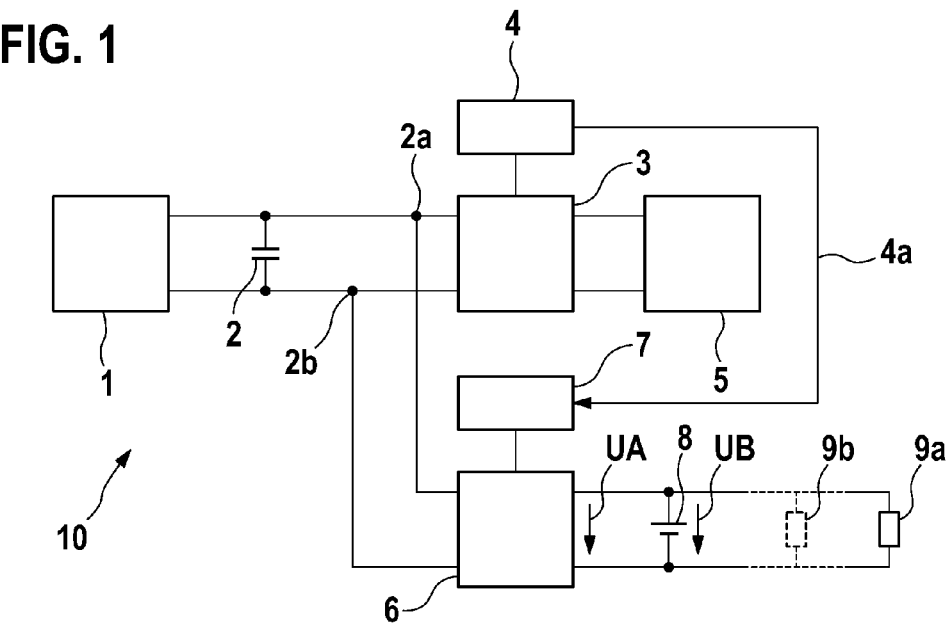
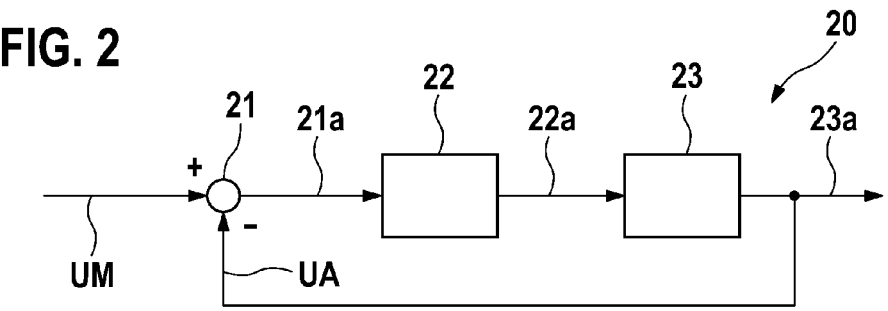
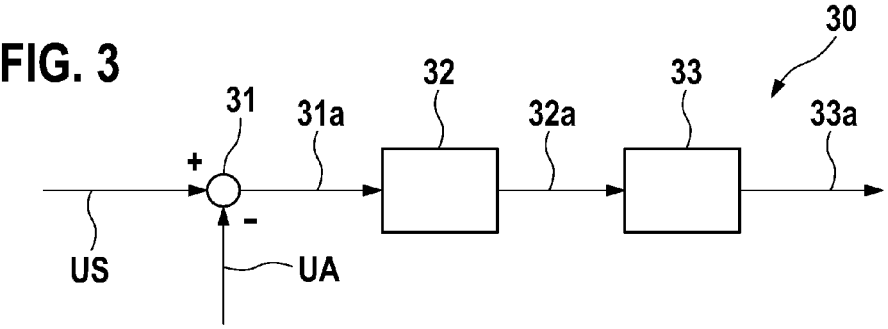

CONTROL DEVICE FOR A DC-TO-DC CONVERTER OF AN ELECTRICAL DRIVE SYSTEM, AND A METHOD FOR OPERATING A DC-TO-DC CONVERTER

BACKGROUND OF THE INVENTION

The invention relates to a control device for a DC-to-DC converter and a method for operating a DC-to-DC converter, in particular for the voltage supply of a vehicle electrical system of a hybrid vehicle from a high-voltage network.

The supply of a low-voltage vehicle electrical system by the high-voltage network, which is used to supply the electrical drive of the hybrid vehicle, can be ensured. To this end, a DC-to-DC converter can, for example, be used, which removes energy from the high-voltage network, and the high voltage of the high-voltage network can be converted into a corresponding vehicle electrical system voltage.

If the high-voltage source, for example a traction battery, intermittently or permanently fails, the combustion engine can be used in a hybrid vehicle to supply the high-voltage network. As an alternative, the electrical machine can thereby be operated in generator mode, and the kinetic energy supplied by the combustion engine can be converted into electrical energy. The pulse-controlled inverter connected upstream of the electrical machine can then be operated in a so-called voltage control mode (VCM) in order to alternatively supply the high-voltage network with high voltage.

Because the dynamics of an electrical machine are greater than those of a combustion engine by several orders of magnitude, attention is to be paid during operation that power fluctuations in the low-voltage network are not transmitted to the high-voltage network without damping. There is otherwise the risk that the combustion engine can be stalled as a result of large power surges.

The German patent publication DE 103 215 A1 discloses a method for controlling a vehicle electrical system voltage which is produced by a generator of a combustion engine. To this end, a load response function for controlling voltage as a function of load is used when step changes in load in the vehicle electrical system occur. In the event of drops or additions in load, said load response function prevents excessively high step changes in load from occurring in the generator by means of a voltage rise limitation.

SUMMARY OF THE INVENTION

According to one aspect, the present invention creates a control device for actuating a DC-to-DC converter, said control device comprising a voltage regulating means which is designed as the control variable to regulate the output voltage of the DC-to-DC converter. In so doing, the control device is designed to receive an operating mode selection signal and to adjust the voltage regulating means as a function of said operating mode selection signal such that said voltage regulating means limits the output voltage of the DC-to-DC converter to a predetermined constant maximum voltage and to adjust the current regulating means such that said current regulating means uses the difference between a predetermined nominal output voltage and the output voltage of the DC-to-DC converter as the control deviation.

According to a further aspect, the present invention creates an electrical drive system, in particular for a hybrid vehicle, comprising a high-voltage intermediate circuit which is supplied by a high-voltage source, a pulse-controlled inverter which is coupled to the high-voltage intermediate circuit, an electrical machine which is coupled to the pulse-controlled inverter; a DC-to-DC converter which is coupled to the pulse-controlled inverter and the high-voltage intermediate circuit and is designed to convert a high voltage from the high-voltage intermediate circuit into a low voltage for a vehicle electrical system; a low-voltage battery which is coupled to the DC-to-DC converter; a plurality of selectively-connectable electrical consumers of the vehicle electrical system, which are coupled to the low-voltage battery and the DC-to-DC converter; and an inventive control device which is designed to actuate the DC-to-DC converter in order to supply the low-voltage battery and the plurality of vehicle electrical system consumers with a low voltage from the high-voltage intermediate circuit.

According to a further aspect, the present invention creates a method for operating a DC-to-DC converter, comprising the steps of determining whether the input voltage of the DC-to-DC converter is provided by an electrical machine in generator mode, outputting a corresponding operating mode selection signal and operating the DC-to-DC converter in a current-controlled manner as a function of the operating mode selection signal. The operation of the DC-to-DC converter comprises thereby the steps of limiting the output voltage of said DC-to-DC converter to a predetermined constant maximum voltage and regulating the output current of said DC-to-DC converter to a control deviation which is formed by the difference between a predetermined nominal output voltage of said DC-to-DC converter and the output voltage of said DC-to-DC converter.

An idea underlying the present invention is to operate the DC-to-DC converter connected between a high-voltage network and a low-voltage network in an intelligent control mode; thus enabling power fluctuations in the low-voltage network to only be transmitted to the high-voltage network with an appropriately adjustable delay, i.e. in a damped manner. This is particularly advantageous if the high voltage of the high-voltage network is provided by an electrical machine and a pulse-controlled inverter in the voltage control mode.

A further idea underlying the present invention is to use present electrical components of the vehicle electrical system and the DC-to-DC converter in order to achieve a damping of the power fluctuations in said vehicle electrical system with respect to the high-voltage network. As a result, the electrical drive system can be designed without the installation of additional components.

According to one embodiment, the electrical drive system can furthermore comprise a power inverter control device which is designed to actuate the pulse-controlled inverter in a voltage control mode in order to supply the high-voltage circuit by means of the electrical machine in the event of a failure of the high-voltage source. This provides the advantage of high voltage being alternatively or temporarily maintained in the high-voltage network of a hybrid vehicle.

The power inverter control device can be advantageously designed to output an operating mode selection signal to the control device, which signal indicates that the power inverter control device is operating the pulse-controlled inverter in a voltage control mode. In so doing, the current control mode of the DC-to-DC converter can be correlated to a voltage control mode of the pulse-controlled inverter in order to suppress large power fluctuations in the high-voltage network as long as the combustion engine of the hybrid vehicle is taking care of providing the high voltage in the high-voltage network. As a result, power surges on the part of the vehicle electrical system can be prevented in the high-voltage network, whereby the combustion engine can run more reliably.

According to one embodiment, the maximum voltage can be greater than the nominal output voltage. A sufficient damping reserve in the low-voltage battery can be ensured by means of a predetermined difference between nominal output voltage and maximum voltage. This is case whether vehicle electrical system consumers are coupled or decoupled from said low-voltage battery.

BRIEF DESCRIPTION OF THE DRAWINGS

Further features and advantages of embodiments of the invention ensue from the following description with reference to the attached drawings.

In the drawings:

FIG. 1 shows a schematic depiction of an electrical drive system of a hybrid vehicle according to one embodiment of the invention;

FIG. 2 shows a schematic depiction of a voltage regulator of a control device for a DC-to-DC converter according to a further embodiment of the invention;

FIG. 3 shows a schematic depiction of a current regulator of a control device for a DC-to-DC converter according to a further embodiment of the invention;

DETAILED DESCRIPTION

Figure 4:
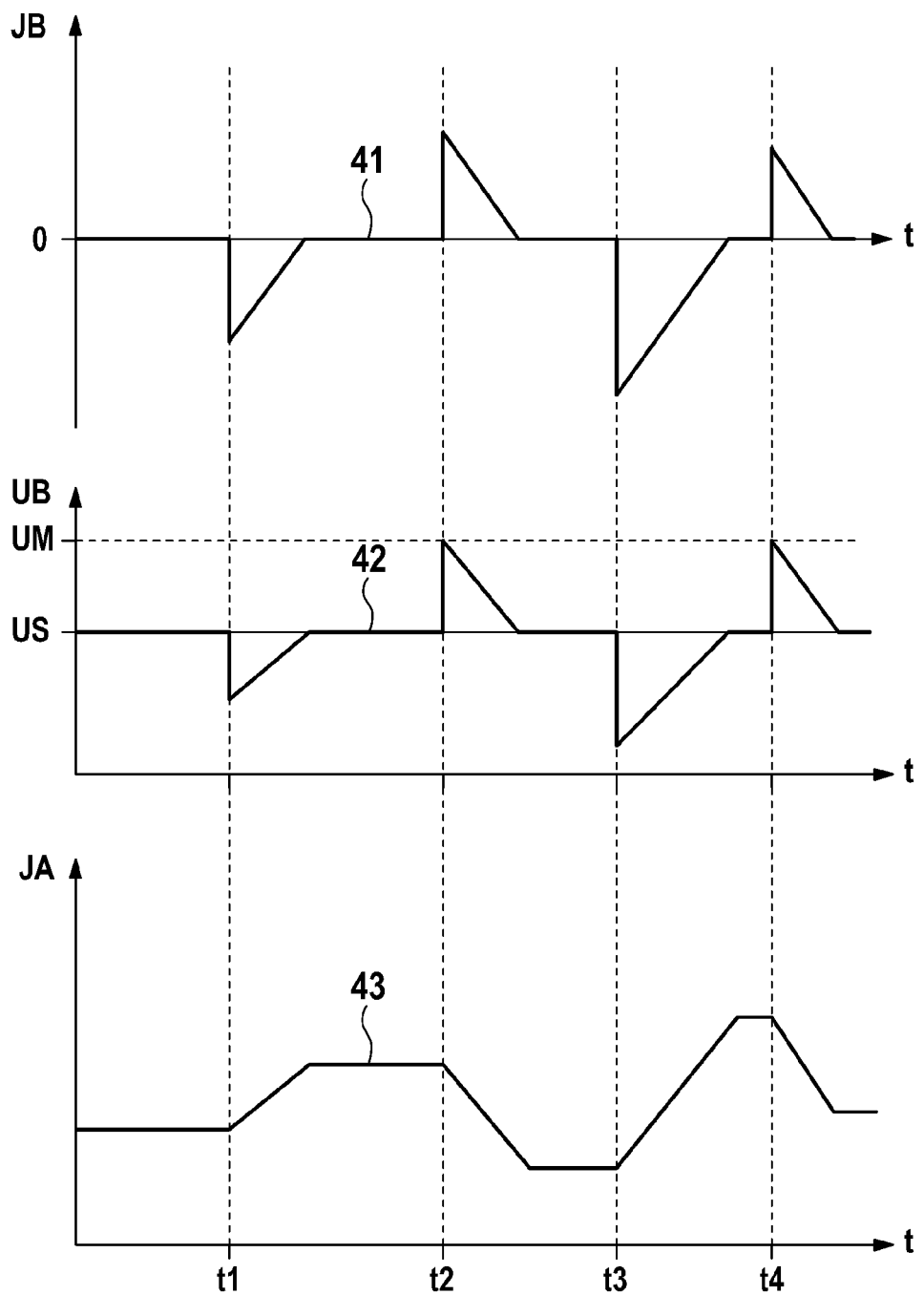
FIG. 4 shows a schematic depiction of exemplary time courses of electrical operating variables in a vehicle electrical system according to a further embodiment of the invention.

FIG. 1 shows a schematic depiction of an electrical drive system 10, for example of a hybrid vehicle. The electrical drive system 10 can comprise a high-voltage source 1, for example a traction battery or another energy storage device of a hybrid vehicle. The high-voltage source 1 feeds a high-voltage intermediate circuit 2, which can, for example, comprise an intermediate circuit capacitor. The high-voltage intermediate circuit 2 is coupled on the one hand via nodes 2a and 2b to input terminals of a pulse-controlled inverter 3 and on the other hand to input terminals of a DC-to-DC converter 6.

The pulse-controlled inverter 3 is coupled by means of output terminals to an electrical machine 5 and is designed to convert electrical energy provided by the high voltage source 1 for the supply of the electrical machine 5 for driving the hybrid vehicle. As a result, a power inverter control device 4 is provided which is designed to actuate the pulse-controlled inverter 3 for the supply of the electrical machine 5 with electrical energy.

The DC-to-DC converter 6 can be designed to convert the high voltage from the high voltage network, which is provided by the high-voltage intermediate circuit 2, into a low voltage, for example for a vehicle electrical system of the hybrid vehicle. In so doing, the DC-to-DC converter 6 can convert an input voltage UE, which can correspond to the high voltage applied to the high voltage intermediate circuit 2, into an output voltage UA. The input voltage UE can thereby be several hundred volts, whereas the output voltage UA can, for example, be between 5 and 20 volts. The output voltage UA can thus serve to supply a low-voltage battery or, respectively, a vehicle electrical system battery 8 whereat the battery voltage UB can drop. A plurality of electrical consumers 9a, 9b of the vehicle electrical system, which can be selectively connected to or disconnected from the output terminals of the DC-to-DC converter 6, can furthermore be connected up to the vehicle electrical system. In FIG. 1, only two vehicle electrical system consumers 9a, 9b are shown by way of example, wherein any other number of vehicle electrical system consumers is however likewise possible. Vehicle electrical system consumers can, for example, include an air conditioning system, a cigarette lighter, an on-board computer, a HiFi system or similar electrical components of a vehicle.

In the event of the high voltage source 1 being defective or malfunctioning, i.e. the high voltage intermediate circuit 2 can no longer be supplied by said high voltage source, the electrical drive system 10 can be designed to feed the high-voltage network by means of kinetic energy from the combustion engine (not depicted) of the hybrid vehicle. As a result, the electrical machine 5 can be operated in generator mode and kinetic energy provided by the combustion engine can be converted into electrical energy. The pulse-controlled inverter 3 can be actuated in this case in such a manner that the electrical machine 5 supplies high voltage to the high-voltage network or, respectively, the high-voltage intermediate circuit. The power inverter control device 4 can thereby be designed to operate the pulse-controlled inverter 3 in a voltage control mode.

If the power inverter control device 4 operates the pulse-controlled inverter 3 in the voltage control mode, said power inverter control device 4 can transmit an operating mode selection signal 4a which is delivered to a control device 7 of the DC-to-DC converter 6. The control device of the DC-to-DC converter 6 is designed to actuate said DC-to-DC converter 6 to convert the high voltage from the high-voltage intermediate circuit 2 into the vehicle electrical system voltage UA. If the control device 7 receives the operating mode selection signal 4a, said control device 7 can switch over from the usual normal operation of the DC-to-DC converter 6 into a current control mode of said DC-to-DC converter 6, i.e. the output current IA of said DC-to-DC converter is controlled in the current control mode instead of the output voltage UA of said DC-to-DC converter 6.

In FIGS. 2 and 3, schematic depictions of a voltage regulating means 20 as well as a current regulating means 30 of the control device from FIG. 1 are shown. The voltage regulating means 20 comprises a subtracter 21 which is supplied with a command variable. During normal operation, the command variable can be the nominal voltage of the DC-to-DC converter 6. Furthermore, the control variable 23a of the voltage regulating means 20 is fed back in a feed-back loop to the subtracting input of the subtracter 21. During normal operation, the feed-back variable can be the actual voltage, i.e. the output voltage of the DC-to-DC converter 6. The subtracter 21 outputs a control deviation 21a which is fed to a controller 22 that produces a correcting variable 22a as a function of the control deviation 21a, said correcting variable being supplied to the closed loop controlled system 23. The closed loop controlled system 23 can thereby be subjected to disturbance variables and outputs the variable 23a as the control variable, which can, for example, be the output voltage or, respectively, the actual voltage of the DC-to-DC converter 6.

FIG. 2 shows the voltage regulating means 20 in the voltage control mode. In this case, a predetermined constant maximum voltage UM is fed in as the command variable, which denotes the maximum value of the output voltage UA of the DC-to-DC converter 6. The maximum value UM can, for example, be 15 volts. The voltage regulating means 20 is operated in this case as a limiting device for the output voltage UA of the DC-to-DC converter, i.e. the voltage regulating means 20 ensures that the output voltage UA of said DC-to-DC converter never exceeds the predetermined constant maximum voltage UM.

In lieu thereof, the DC-to-DC converter 6 is operated via the current regulating means 30 shown in FIG. 3 in the current control mode. The current regulating means 30 comprises a subtracter 31, to which a command variable is fed. In the current control mode, the command voltage can be the nominal output voltage US of the DC-to-DC converter. The actual voltage or, respectively, the output voltage UA of the DC-to-DC converter is furthermore fed to the subtracting input of the subtracter 31. The subtracter 31 therefore outputs a difference between the nominal output voltage US of the DC-to-DC converter 6 and the output voltage UA of said DC-to-DC converter 6 as the control deviation 31a, which is fed to a controller 32 that produces a correcting variable 32a as a function of the control deviation 31a, said correcting variable being fed to the closed loop controlled system 33. The closed loop controlled system 33 can thereby be subjected to disturbance variables and outputs the variable 33a as control variable, which can, for example, be the output current IA of the DC-to-DC converter 6.

The DC-to-DC converter 6 can be operated in the current control mode with the control device 7 in FIG. 1, which can comprise a voltage regulating means 20 pursuant to FIG. 2 and a current regulating means 30 pursuant to FIG. 3. This results from the fact that the output voltage UA of the DC-to-DC converter 6 is controlled only via the current regulating means 30. As a result, a behavior of the electrical drive system 10 can be achieved which is explained below in detail in reference to the exemplary time courses of the electrical operating variables of the electrical drive system 10 in FIGS. 4 and 5.

From the perspective of the high-voltage network, the DC-to-DC converter 6 can emulate a consumer having approximately constant load in the current control mode. As a result, it is possible for the power inverter control device 4 of the pulse-controlled inverter 3 to be supported by a relatively constant load in the high-voltage network. Large step changes in load and torque fluctuations in the electrical machine 5, which could lead to problems during operation of the combustion engine, can thereby be effectively prevented.

Increasing the output voltage UA of the DC-to-DC converter to a predetermined constant maximum value UM can result in the low-voltage battery 8 being constantly charged and in so doing acting as a dynamic additional vehicle electrical consumer. The time courses 41 and 42 show exemplary courses for the current IB or the voltage UB in the low-voltage battery 8. The vehicle electrical system is initially in control equilibrium and the current regulating means 30 controls the output current IA of the DC-to-DC converter such that the voltage UB of the low-voltage battery is kept approximately constant at the nominal output voltage US. The nominal output voltage US can, for example, be a predetermined value which is less than the maximum voltage UM, for example a value between 10 and 13 volts. It can thereby be ensured that a permanent overloading of the low-voltage battery 8 and, for example, the resulting risk of fire are prevented. The difference between the nominal output voltage US and the maximum voltage UM can be appropriately set in order to be able to use the low-voltage battery as a dynamic vehicle electrical system consumer having a correspondingly high damping reserve.

At a first point in time t1, a consumer in the vehicle electrical system can, for example, be switched on, i.e. the voltage UB at the low-voltage battery drops abruptly at the low-voltage battery 8. Instead of now likewise abruptly raising the output voltage UA of the DC-to-DC converter 6, which would lead to large power fluctuations in the high-voltage network, the low-voltage battery 8 takes on the task of supplying energy to the activated consumer for a certain period of time after the first point in time t1.

Figure 5:
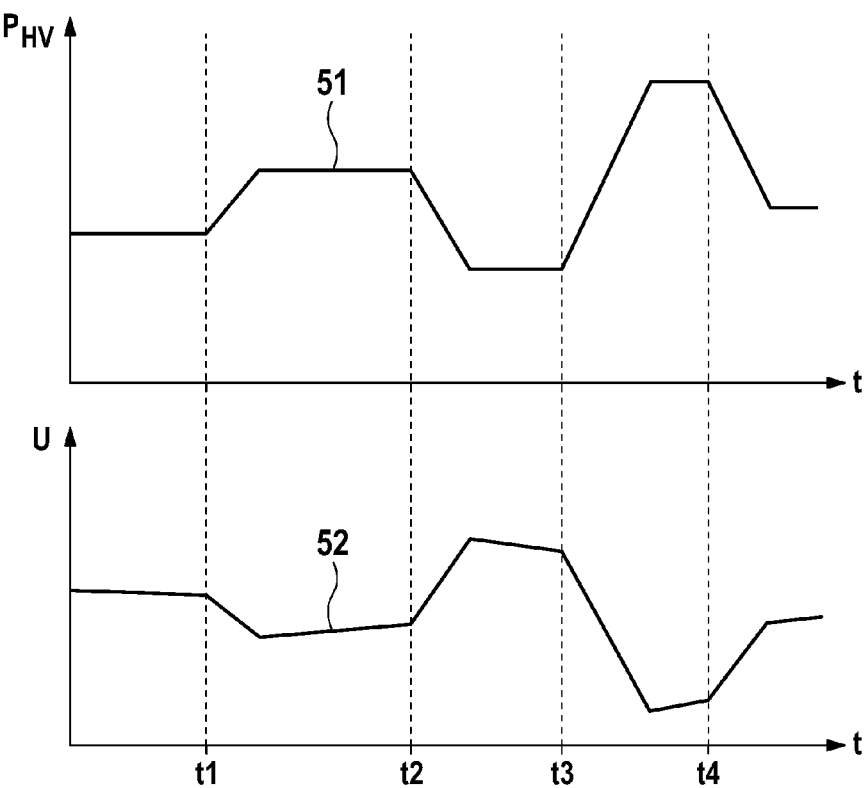
FIG. 5 shows a schematic depiction of exemplary time courses of electrical operating variables in a vehicle electrical system according to a further embodiment of the invention.

The time course 42 thus depicts the drop in the battery voltage UB at the first point in time t1. The time course 41 simultaneously depicts a negative current IB through the low-voltage battery 8, i.e. the low-voltage battery 8 is partially discharged. The time course 43 depicts the current control of the current regulating means 30, which slowly adjusts the output current IA upwards. In so doing, the power consumption from the high-voltage network, which in FIG. 5 is schematically depicted by the time course 51, increases at the same rate as the output current IA of the DC-to-DC converter 6 is adjusted upwards. The time course 52 in FIG. 5 shows the state of charge of the low-voltage battery 8 which drops from the first point in time t1 as long as said low-voltage battery 8 supplies the activated vehicle electrical system consumer with energy.

After the voltage UB at the low-voltage battery 8 has again achieved the nominal output voltage value US, the vehicle electrical system is again in control equilibrium. At a second point in time t2, a vehicle electrical system consumer is switched off. In so doing, the voltage UB of the low-voltage battery 8 increases, does not, however, exceed the predetermined constant maximum value UM due to the limiting function of the voltage regulating means 20. The low-voltage battery 8 then takes on the charge of the vehicle electrical system consumer which has now been switched off and is again partially recharged as is shown in the time course 52. This is depicted by a positive current IB through the low-voltage battery 8, as is depicted by time course 41.

The current regulating means 30 again adjusts the output current IA downwards, as is shown by way of example in the progression of time course 43, until the voltage UB of the low-voltage battery 8 again has achieved the nominal output voltage value US. In equal measure, the power requirements 51 from the high-voltage network drop.

Vehicle electrical system consumers are again switched on or off at third and fourth points in time t3 or t4; and the current regulating means 30 controls the output current IA of the DC-to-DC converter 6 as previously described in reference to the first and second points in time t1 or t2.

In order that a gentle entry is facilitated into the current control mode, the DC-to-DC converter 6 can be operated by the power inverter control device 7 at a current limit optimized for the start-up for a predetermined length of time after receiving the operating mode selection signal 4a. The current limit can, for example, be 30 amperes and in particular less than the minimum current in the vehicle. It is thereby ensured that the current required is always available and the power inverter control device 7 has sufficient time to adapt the control of the pulse-controlled inverter 3 to the load requirements of the vehicle electrical system.

Figure 6:
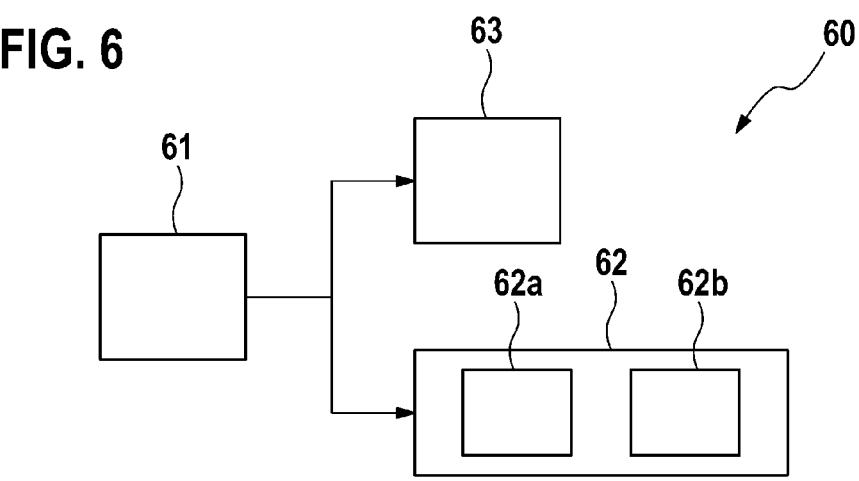
FIG. 6 shows a schematic depiction of a method for operating a DC-to-DC converter according to a further embodiment of the invention.

FIG. 6 shows a schematic depiction of a method 60 for operating a DC-to-DC converter, in particular a DC-to-DC converter 6 in an electrical drive system 10 of a hybrid vehicle as is shown by way of example in FIG. 1. In a first step 61, it is determined whether the input voltage of the DC-to-DC converter is provided by an electrical machine in generator mode. If this is the case, a corresponding operating mode selection signal can be outputted, for example by a control device of a pulse-controlled inverter associated with the electrical machine. In the event that the high-voltage network, to which the DC-to-DC converter can be connected, is regularly fed by the high-voltage source, a usual voltage control operation of the DC-to-DC converter can take place in step 63.

In the event, however, that the operating mode selection signal has been activated and the electrical machine in combination with the pulse-controlled inverter has taken over supplying the high-voltage network with a high voltage, the operation of the DC-to-DC converter can take place in a current-controlled manner in step 62. To this end, a current limit for the current, which limit is initially optimized for the start-up of the operating mode as explained above, can be activated in a current regulating means of the DC-to-DC converter in order to facilitate a gentle start-up of the current control mode.

After the initial start-up of the current control mode, the operation of the DC-to-DC converter can include steps 62a and 62b of limiting the output voltage of said DC-to-DC converter to a predetermined constant maximum voltage or of regulating the output current of said DC-to-DC converter to a control deviation, wherein the control deviation is formed by the difference between a predetermined nominal output voltage of said DC-to-DC converter and the output voltage of said DC-to-DC converter.

The invention claimed is:

1. A control device (7) for actuating a DC-to-DC converter (6), comprising:
    a voltage regulator (20), configured to regulate the output voltage (UA) of the DC-to-DC converter (6) as the control variable, and
    a current regulator (30), configured to regulate the output current (IA) of the DC-to-DC converter (6) as the control variable,
    wherein the control device (7) is designed to receive an operating mode selection signal (4a) and adjust the voltage regulator (20) as a function of the operating mode selection signal (4a) such that said voltage regulator (20) limits the output voltage (UA) of the DC-to-DC converter (6) to a predetermined constant maximum voltage (UM), and to adjust the current regulator (30) such that said current regulator (30) uses the difference between a predetermined nominal output voltage (US) and the output voltage (UA) of the DC-to-DC converter (6) as the control deviation.

2. The control device (7) according to claim 1, wherein the maximum voltage (UM) is greater than the nominal output voltage (US).

3. The control device (7) according to claim 1, wherein the operating mode selection signal (4a) indicates whether the input voltage (UE) of the DC-to-DC converter (6) is provided by an electrical machine (5) and wherein the control device (7) is designed to operate the DC-to-DC converter (6) in a current-controlled manner if the input voltage (UE) of said DC-to-DC converter (6) is provided by an electrical machine (5).

4. An electrical drive system (10) comprising:
    a high-voltage intermediate circuit (2) which is fed by a high voltage source (1);
    a pulse-controlled inverter (3) which is coupled to the high-voltage intermediate circuit (2);
    an electrical machine (5) which is coupled to the pulse-controlled inverter (3);
    a DC-to-DC converter (6) which is coupled to the pulse-controlled inverter (3) and the high-voltage intermediate circuit (2) and is designed to convert a high voltage (UE) from the high-voltage intermediate circuit (2) into a low voltage (UA) for a vehicle electrical system;
    a low-voltage battery (8) which is coupled to the DC-to-DC converter (6);
    a plurality of selectively-connectable electrical consumers (9a, 9b) of a vehicle electrical system, which are coupled to the low-voltage battery (8) and the DC-to-DC converter (6); and
    a control device (7) according to claim 1 which is designed to actuate the DC-to-DC converter (6) in order to supply the low-voltage battery (8) and the plurality of vehicle electrical system consumers (9a, 9b) with a low voltage (UA) from the high voltage intermediate circuit (2).

5. The electrical drive system (10) according to claim 4, wherein the control device (7) is designed to adjust the current control equipment (3) such that the difference between a predetermined nominal output voltage (US) and the output voltage (UA) of the DC-to-DC converter (6) is used as the control deviation if the electrical machine (5) is operated in the generator mode and the high-voltage intermediate circuit (2) is fed by the pulse-controlled inverter (3) and the electrical machine (5).

6. The electrical drive system (10) according to claim 4 further comprising: a power inverter control device (4) which is designed to actuate the pulse-controlled inverter (3) in a voltage control mode in order to supply the high-voltage intermediate circuit (5) by the electrical machine (5) in the event of a failure of the high voltage source (1).

7. The electrical drive system (10) according to claim 6, wherein the power inverter control device (4) is designed to output an operating mode selection signal (4a) to the control device (7), said signal indicating that said power inverter control device (4) is actuating the pulse-controlled inverter (3) in a voltage control mode.

8. A method (60) for operating a DC-to-DC converter (6), the method comprising:
    determining (61) whether the input voltage (UE) of the DC-to-DC converter (6) is provided by an electrical machine (5) in a generator mode and
    outputting a corresponding operating mode selection signal (4a);
    operating (62) the DC-to-DC converter (6) in a current-controlled manner as a function of the operating mode selection signal (4a), wherein the operation of the DC-to-DC converter (6) comprises:
    limiting (62a) the output voltage (UA) of the DC-to-DC converter (6) to a predetermined constant maximum voltage (UM); and
    regulating (62b) the output current of the DC-to-DC converter (6) to a control deviation which is formed by the difference between a predetermined nominal output voltage (US) of the DC-to-DC converter (6) and the output voltage (UA) of said DC-to-DC converter (6).

9. The method (60) according to claim 8, wherein the maximum voltage (UM) is greater than the nominal output voltage (US).

* * * * *